Patented June 23, 1953

UNITED STATES PATENT OFFICE 2,643,254

PIPERAZINE COMPOUNDS AND METHOD FOR MAKING SAME

Henri Gustave Prosper Jacob Morren, Forest, Brussels, Belgium, assignor to Union Chimique Belge, S. A., Brussels, Belgium, a corporation of Belgium No Drawing. Application October 19, 1949, Serial No. 122,351. In Belgium and Belgian Congo October 30, 1948

17 Claims. (Cl. 260—268)

This invention relates to a new class of substituted piperazine compounds and a method for making them. More particularly, it deals with the carbonyl halides of alkyl piperazines and their acidulous salts which new compounds are very valuable as intermediate products in the production of pharmaceuticals such as described in the co-pending application of Henri Morren, S. N. 122,352 filed October 19, 1949.

It is an object of this invention to produce such new compounds in a simple, efficient, effective and economic manner.

The new compounds of this invention have the following general structural formula:

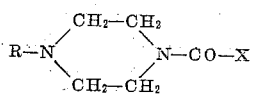

wherein R is a saturated alkyl radical, of straight or branched chain type, containing less than about 10 carbon atoms, and preferably less than about 5 carbon atoms; and wherein X is a halide, preferably a Cl, Br or I atom.

This new class of compounds may be produced by reacting the desired alkyl piperazine or its hydrohalide or acidulous salt with a carbonyl halide in an inert solvent solution, such as for example a solution of benzene, toluene, xylenes, or a mixture thereof, etc. The reaction is carried out slowly at moderate temperatures preferably below 100° C., and preferably in a closed vessel, to produce the hydrohalide salt of the compound, which then may be treated with a weak base, other than ammonia or its derivatives, to produce the corresponding free base.

For example, some of the specific compounds which may be produced by the process of this invention include the 1-methyl, 1-ethyl, 1-propyl, 1-isopropyl, 1-butyl, 1-iso-butyl, or the like-piperazine - 4 - carbonylchloride, - bromide, or -iodide, and their corresponding 1-alkyl-1-hydrochloride, -hydrobromide, or -hydroiodide salts of piperazine-4-carbonylhalide, which salts have the following general structural formula:

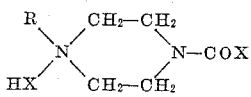

wherein R is an alkyl radical of the type above mentioned and X is a halogen.

The above mentioned and other features and objects of this invention and the manner of attaining them will become more apparent and the invention itself will be best understood by reference to the following specific examples of the preparation of different compounds of this invention and their properties.

Example I 1-methyl - 1 - hydrochloride-piperazine-4-carbonylchloride having the structural formula:

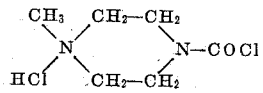

was prepared from a solution of 20 grams (0.2 M) of N-methyl piperazine dissolved in 200 cc. of benzene into which solutions was slowly poured another solution of 40 grams of phosgene dissolved in 200 cc. of toluene. During the mixing the N-methyl piperazine solution was cooled with ice water to maintain the temperature of the mixture below about 5° C. After addition of all the phosgene solution, the resulting cold mixture was then placed in a closed vessel and heated on a water-bath for 5 hours during which time it was stirred occasionally. After this time, the mixture was allowed to cool to room temperature and the resulting white precipitate was separated by filtration, washed with benzene, and found to comprise 38 grams of 1-methyl-1-hydrochloride-piperazine-4-carbonyl-chloride which new compound decomposed at its melting point of 224–225° C.

Example II

The same compound mentioned in Example I above was also prepared by dissolving 40 grams of phosgene in 200 cc. of toluene and adding to this phosgene solution, 35 grams of N-methyl-piperazine dihydrochloride dissolved in 300 cc. of benzene. The resulting mixture was then heated in a closed vessel for 20 hours at a temperature of between about 80° and 90° C. during which time it was stirred occasionally. Then the mixture was cooled to room temperature, the solvents were decanted from the resulting precipitate, and the precipitate was ground in a mortar in the presence of ethyl ether to thoroughly wash the crystals of the precipitate, after which the precipitate was filtered and dried. This dried white precipitate weighed 36 grams and was found to be 1 - methyl-1-hydrochloride-piperazine-4-carbonylchloride which decomposed at its melting point of 222°–225° C.

Example III

The free base salt of the compound prepared by Example I or II above was obtained by dissolving the compound in a small amount of water at room temperature and saturating the resulting aqueous solution with potassium carbonate at the same temperature. The resulting mixture was then extracted several times with benzene and the benzene solution was collected and distilled under vacuum at a pressure between 2.5 to 3 mm. of mercury. The fraction of the distillate which passed over between the temperatures of 83° and 85° C. was found to be 1-methyl-piperazine-4-carbonylchloride, which at ordinary pressure appeared to be a colorless liquid.

The above new compounds have been found to react easily and well with primary and secondary amines to produce very valuable pharmaceuticals having therapeutic activity, particularly against filariasis.

While there is described above the principle of this invention in connection with specific examples, it is to be clearly understood that this description is made only by way of example and not as a limitation to the scope of this invention.

What is claimed is:

1. A compound of the group consisting of the following free base and its hydrohalide salts, said free base having the formula

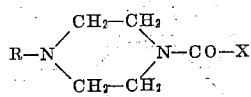

wherein R is a saturated alkyl radical having less than 10 carbon atoms and X is a halogen.

2. The compound of claim 1 wherein said alkyl radical contains less than 5 carbon atoms.

3. The compound of claim 2 wherein said alkyl radical is a methyl radical.

4. The compound of claim 1 wherein said halogen is chlorine.

5. The N-hydrohalide salts of the compounds of claim 1.

6. 1-methylpiperazine-4-carbonyl chloride.

7. 1-methyl-1-hydrochloride-piperazine-4-carbonylchloride.

8. A method of preparing the hydrohalide salts of the compounds of claim 1 comprising reacting the corresponding 1-alkyl-piperazine compound with the corresponding carbonyl halide in an inert solvent solution.

9. The method of claim 8 wherein said reaction is carried out at a temperature below 100° C.

10. The method of claim 8 wherein said 1-alkyl-piperazine compound is 1-alkyl-piperazine.

11. The method of claim 8 wherein said 1-alkyl-piperazine compound is the corresponding 1-alkyl-1-hydrohalide of said compound.

12. The method of claim 8 wherein said inert solvent is selected from the group of organic solvents consisting of benzene, toluene and xylenes.

13. The method of claim 8 wherein said halides are chlorides.

14. The method of claim 8 wherein said alkyl radical is a methyl radical.

15. A method for preparing the free base of claim 1 comprising reacting the corresponding 1-alkyl-piperazine with the corresponding carbonylhalide in an inert solvent solution and neutralizing the resulting hydrohalide salt with a weak base other than ammonia and its derivatives.

16. The method of claim 15 including the additional final step of purifying said extracted free base by vacuum distillation.

17. The method of claim 8 wherein said reaction is carried out in the presence of an excess of said carbonyl halide.

HENRI GUSTAVE PROSPER
JACOB MORREN.

References Cited in the file of this patent

Morren et al., Bull. Soc. Chim. Belges, 58, 103–11 (1949), published May 15, 1949.

Houben-Weil, Die Methoden der Organischen Chemie, vol. 4, (3rd edition), (1941), p. 537.

Shriner et al., J. Am. Chem. Soc. 53, 1601–1605 (1931).

Kushner et al., J. Org. Chem. 13, 144–153 (1948).

Franchemont et al., Rec. Trav. Chim. 13, 333–334 (1894).

Werner, J. Chem. Soc. 115, 1013 (1919).